United States Patent
Rübel et al.

(10) Patent No.: US 10,012,262 B2
(45) Date of Patent: *Jul. 3, 2018

(54) FLEXURE HINGE

(71) Applicant: WIPOTEC GmbH, Kaiserslautern (DE)

(72) Inventors: Andreas Rübel, Olsbrücken (DE); Christian Bur, Saarbrücken (DE)

(73) Assignee: Wipotec GmbH, Kaiserslautern (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/610,491

(22) Filed: May 31, 2017

(65) Prior Publication Data

US 2017/0350443 A1    Dec. 7, 2017

(30) Foreign Application Priority Data

Jun. 1, 2016   (DE) .................. 10 2016 110 151

(51) Int. Cl.
  *E05D 1/00* (2006.01)
  *F16C 11/12* (2006.01)
  (Continued)

(52) U.S. Cl.
  CPC .......... *F16C 11/12* (2013.01); *B23K 26/0619* (2015.10); *B23K 26/384* (2015.10); *E05D 1/02* (2013.01)

(58) Field of Classification Search
  CPC ... Y10T 16/525; Y10T 16/54; Y10T 16/5253; Y10T 16/548; E05D 1/00; E05D 1/02; E05D 9/005; E05D 7/00; B29L 2031/22; B29C 51/00; B29C 65/70; B29C 66/71; B29C 66/712; B29K 2105/06; B29K 2105/089; F16C 11/12; B23K 26/0619; B23K 26/384
  See application file for complete search history.

(56) References Cited

U.S. PATENT DOCUMENTS 2,484,581 A * 10/1949 Pallmen .............. E05D 1/06
                                                      16/257
2,526,129 A * 10/1950 Groesbeck ........... E05D 1/02
                                                      16/225
(Continued)

FOREIGN PATENT DOCUMENTS

DE       10229016 A1    2/2004
DE    102016105985 A1   10/2017
(Continued)

OTHER PUBLICATIONS

Search Report in EP Application No. 17173582.2, dated Sep. 11, 2017 (with partial English translation).
(Continued)

*Primary Examiner* — Chuck Mah
(74) *Attorney, Agent, or Firm* — The Culbertson Group, P.C.

(57) ABSTRACT

A flexure hinge with two material segments connected to each other via a material tapering to a thin spot which defines a pivot axis between the two material segments. The material segments are provided with recesses such that the strength existing in the thin spot with respect to normal stresses or bending stresses is kept largely constant within a distance from the thin spot.

15 Claims, 6 Drawing Sheets

(51) Int. Cl.
*E05D 1/02* (2006.01)
*B23K 26/384* (2014.01)
*B23K 26/06* (2014.01)

(56) References Cited

U.S. PATENT DOCUMENTS

| | | | | |
|---|---|---|---|---|
| 3,618,161 | A * | 11/1971 | Takamitu | B65F 1/1607 16/227 |
| 3,720,979 | A * | 3/1973 | Krawagna | A45C 13/005 16/227 |
| 4,485,881 | A | 12/1984 | Tramposch et al. | |
| 4,619,304 | A * | 10/1986 | Smith | E05D 1/00 16/226 |
| 5,002,979 | A * | 3/1991 | Stoyan | C08F 220/24 523/107 |
| 5,439,417 | A * | 8/1995 | Sells | E04D 3/40 16/225 |
| 5,445,471 | A * | 8/1995 | Wexler | B60R 22/195 16/225 |
| 6,175,989 | B1 * | 1/2001 | Carpenter | B64G 1/222 136/245 |
| 6,334,235 | B2 * | 1/2002 | Duperray | B25J 17/0241 16/225 |
| 6,447,863 | B1 * | 9/2002 | Lewin | G09F 3/02 40/359 |
| 6,472,618 | B1 | 10/2002 | Izumo et al. | |
| 6,630,094 | B2 * | 10/2003 | Abramson | E05D 1/02 156/219 |
| 7,307,226 | B2 | 12/2007 | Iiduka | |
| 7,354,033 | B1 * | 4/2008 | Murphey | B64G 1/222 267/151 |
| 7,534,971 | B2 | 5/2009 | Kuhlmann et al. | |
| 7,679,229 | B2 * | 3/2010 | Mark | H02K 33/16 267/160 |
| 8,005,521 | B2 * | 8/2011 | Cho | H04M 1/0216 379/433.13 |
| 8,523,944 | B2 * | 9/2013 | Jimenez | F16C 11/12 623/17.15 |
| 2004/0104524 | A1 * | 6/2004 | Watson | F16C 11/12 267/137 |
| 2012/0307423 | A1 * | 12/2012 | Bohn | G06F 1/1641 361/679.01 |
| 2014/0317881 | A1 * | 10/2014 | Heim | E05D 1/02 16/221 |
| 2016/0223591 | A1 | 8/2016 | Graf et al. | |

FOREIGN PATENT DOCUMENTS

| | | |
|---|---|---|
| JP | 2004340593 A1 | 12/2004 |
| JP | 2015114160 A | 6/2015 |

OTHER PUBLICATIONS

German Patent Office Action in DE 10 2016 110 152.4, dated Jan. 11, 2017.

* cited by examiner

FLEXURE HINGE

TECHNICAL FIELD OF THE INVENTION

The invention concerns a flexure, or thin spot, hinge for movable connection of material segments.

BACKGROUND OF THE INVENTION

Hinges are often used in industry to connect components movably to each other. The hinges are intended to allow movements and transfers of force in certain directions, but prevent them in other directions. An example of this is a solid body or flexure hinge. In this case two material segments that are connected to each other monolithically are provided with a material tapering (a so-called "thin spot") in order to enable movements about a pivot axis formed by the thin spot. Pivoting movements about axes perpendicular thereto and translatory relative movements of the two material segments, however, are prevented.

Such flexure hinges are known in particular from modern weighing technology, which utilizes monolithic link arm mechanisms, so-called monoblocks. Through this, production costs are reduced and the precision, reproducibility, and long term stability are improved at the same time. In the case of the monoblocks for balances, thin spots are used, among other places, as hinges for parallelogram arms, for levers, and on coupling rods. In the case of balances that operate on the principle of electromagnetic force compensation, the deflections of the levers or parallel arms are as a rule very small, so that only small pivot angles arise at the hinges.

Processes known for production of thin spots on monoblocks include chip-cutting processes, but erosion (wire erosion) and laser beam machining are also known techniques.

A thin spot has the task of reliably transferring tensile and compressive forces in the form of normal stresses. On the other hand, the thin spot is intended to produce as low as possible a resistance to pivoting about its pivot axis and the bending stiffness about the pivot axis should therefore be as low as possible. This is why the desire is to remove as much material as possible in the region of the thin spot (reduction of the bending stiffness), while maintaining a minimum strength, in particular for normal stresses. To achieve this, the solutions known from the prior art either seek to reduce the cross section of the thin spot further, where the reduction is kept constant over the entire width of the block, or the width of the thin spot is reduced further by, for example, recesses disposed centrally on the pivot axis of the thin spot. Through-holes or drillings (as shown in JP2004340593 A1 and U.S. Pat. No. 7,307,226 B2) or troughs or depressions (as shown in DE 10 2013 108 097 B4 and DE 100 15 311 B4) are known. In any case, besides the desired reduction of the stiffness, the stability (load capacity, strength) is always undesirably reduced, even if it is represented as "acceptable" in the literature.

It is disadvantageous with these known solutions that with a decrease of the bending stiffness, the strength with respect to normal stresses becomes reduced, and vice versa. Moreover, due to material removal, in particular in the thin spot, regions with increased or decreased material stress (hot spots) always result.

SUMMARY OF THE INVENTION

The present invention is directed to flexure hinges that are improved through material removal to preferably reduce the bending stiffness of the hinge while maintaining the strength of the thin spot. Aspects of the invention encompass flexure hinge structures, measurement apparatus including flexure hinge structures, and methods of producing flexure hinges.

The invention is based on the recognition that the strength properties prevailing at the thin spot that involve normal stresses and bending stresses can also be affected in regions at a distance from the thin spot by means of specially shaped recesses. These recesses are positioned and shaped so that the strength of a cross section that passes through the recesses and is at a distance from the thin spot corresponds to that which a comparable cross section through the thin spot itself has. "Strength" in this case can refer to the strength with respect to normal stresses, in particular in the lengthwise direction Y of the hinge, or to the strength with respect to bending about the pivot axis ($W_D$) of the hinge.

The principle according to the invention of maintaining the strength constant over a selectable length on both sides of the thin spot is to be understood to mean that certain, in particular production related, tolerances cannot be excluded or even predetermined. Because of the complex shaping of thin spots and the recesses penetrating them, mutually corresponding strengths are understood, among other things, to be ones that have the goal of a strength property that coincides as much as possible, since in practical terms the goal of an absolutely identical strength at different imaginary cross sections can be achieved only with difficulty or not at all.

It is achieved through the design of the recesses of a flexure hinge according to the invention that the strength existing in the thin spot also remains largely unchanged over a distance from the thin spot, even though the material thicknesses increases beyond the thin spot.

The thin spot itself, as the thinnest spot of the hinge, preferably remains as a "neutral zone," which is designed as intact material. Weaknesses of the thin spot due to recesses made in the thin spot itself can advantageously be omitted.

A flexure hinge according to one aspect of the invention comprises a first and a second material segment, which are monolithically joined to each other via a thin spot. The material thickness of the two material segments measured in a thickness direction X tapers along a tapering zone in the direction of a lengthwise direction Y perpendicular to the X direction up to the thin spot, which has a minimal thickness at this point. The pivot axis of the thin spot extends along a width direction Z running perpendicular to the X and Y directions.

A cross section $Q_D$ running through the thin spot in an X-Z plane and having a section width running in the Z direction yields a cross section area $A_D$. The cross section area $A_D$ can comprise a plurality of partial areas, if the thin spot is divided by openings lying in it and the section width being considered includes such openings.

The cross section area $A_D$ thus formed has a certain strength with respect to normal stresses in the Y direction, where the strength with respect to shear stresses in the Z direction and in particular in the X direction is of subordinate importance. Furthermore, the cross section area $A_D$ lying in the thin spot has a bending strength (moment of resistance about the pivot axis), which is selected to be as small as possible by means of a low material thickness of the thin spot in the X direction.

According to the invention at least one recess is provided in a tapering zone, the shape and position of which is chosen so that it does not change or only negligibly changes the strength existing in the thin spot even along an increasing Y distance from the thin spot. This property is achieved in that a cross section produced by the at least one recess Q', Q" . . . produces, along an X-Z section plane with the section width B, a cross section area A', A" . . . (which can also be composed of a plurality of partial areas), the strength property of which largely corresponds to that of cross section area $A_D$ measured in the thin spot itself.

If the material thickness increases steadily in the Y direction starting from the thin spot, the constant strength with increasing Y distance from the thin spot will be achieved in that the cross section Q' has geometric shapes, in particular rectangles, whose width measured in the Z direction decreases with increasing Y distance from the thin spot. This takes into account the circumstance that the material thickness of the tapering zones increases with increasing Y distance from the thin spot (for example quadratically). Correspondingly, the Z width of the cross section area A', A" . . . or its partial surfaces must become smaller with increasing Y distance from the thin spot, in order to achieve overall the same strength as at the thin spot itself. Preferably, the cross section area A', A" . . . formed in each case remains constant along a segment section ($L_U$) running in the Y direction, and it especially preferably corresponds to the cross section area $A_D$ in the thin spot.

If constant normal stresses (in the Y direction) are desired, the recesses are designed so that the cross section area A' in cross section Q' largely corresponds to cross section area $A_D$ in the thin spot cross section $Q_D$ (area equivalent). In the lengthwise direction Y of the hinge, the cross section area transferring the normal stresses remains constant over a certain segment $L_U$, so that the following applies $$\sigma = \frac{F}{A} = const$$

In a manner different from leaf springs, which do have a constant thickness, but have an undefined point of rotation, the point of rotation in the case of the embodiment aimed at the area equivalent continues to be defined at the site of the least thickness or the least moment of resistance. As a result, in this variation the responsiveness of a balance could be increased by 20% through the reduction of the bending stiffness, while keeping the hinge thickness and strength the same.

If, as an alternative to the area equivalent, the bending stiffness is to be reduced without reducing the bending strength, then the moment of resistance (moment of resistance equivalent) must be kept constant with increasing Y distance from the thin spot, so that the moment of resistance of the cross section area $A_D$ about the pivot axis $W_D$ largely coincides with the relevant moments of resistance of the cross section area A', A" . . . in cross section Q', Q" . . . .

The thin spot is often generated by two borings in a material block, so that it remains as a bridge between the lateral surfaces of two round cylinders lying next to each other. The cross section $Q_D$ at the thin spot, when the thin spot is formed along the imaginary section width B from intact material continuously without openings, then has the shape of a rectangle. The cross section area $A_D$ results in this case from the section width B multiplied by the remaining thickness $X_D$ of the thin spot. If the thin spot is to be penetrated by one or more openings along the imaginary section width B, there will result a plurality of individual rectangular cross section areas lying side by side in the Z direction, which add up to the total surface $A_D$.

According to another advantageous embodiment of the invention, the at least one recess in a tapering zone is chosen so that the cross section Q', Q" . . . generates a plurality of geometric shapes, preferably of the same size, where these are preferably rectangles. In each case, according to the design of the walls of the recesses, the individual partial cross sections can, however, also have the shape of a trapezoid, a parallelogram, a polygon, or a surface formed from straight lines and/or curves. In an especially preferred case the recesses have wall surfaces that run parallel to the X direction, so that individual rectangles arise in the cross section Q', Q" . . . .

The recesses in accordance with the invention do not have to completely penetrate the tapering zones. The term "recesses" is also intended to include depressions. For example, it is conceivable to introduce depressions lying opposite each other in the X direction and offset from each other in the Z direction in one or both tapering zones. In the same way, recesses that completely penetrate the tapering zone can be combined with depressions that do not. What is decisive for the result in accordance with the invention is the design of the recesses so that the strength of the thin spot corresponds roughly with that in the region of the recesses.

An advantageous embodiment of the invention provides that at least one recess in a section with a Y-Z plane has an outline in which two boundary lines extend out from a common vertex, which lies closest to the thin spot, in the Y direction from the thin spot, where at least one, preferably both boundary lines move away, preferably symmetrically, from an X-Y plane passing through the vertex, with increasing Y distance. As is evident from the drawings described below, the course of the boundary lines takes into account the increasing material thickness of the tapering zone with increasing Y distance from the thin spot, so that the cross section area A', A" . . . resulting from the section Q', Q" . . . has essentially the same strength for each section through the recess as the thin spot itself. Thus, according to the invention, the curve is a function of the material thickness, which is dependent on the Y position. In the case of a steadily increasing material thickness in the tapering zone, a monotonic dependence of the course of the curve of the boundary line on the Y distance from the thin spot results. The result according to the invention is, however, also achieved when the material thickness does not steadily increase, provided this is taken into account in the shape of the recesses to achieve cross section areas with largely constant strength.

Preferably, the flexure hinge is provided with a plurality of recesses, which lie side by side in width direction Z. This results in a uniform stress distribution over the viewed section width B. Expediently, the recesses have the same shape, which simplifies production and calculation. Moreover, the recesses preferably have the same spacings from each other in the Z direction, which distributes stresses still more uniformly over the width of the hinge.

One embodiment of the invention provides that all recesses are spaced a little in the Y direction from the thin spot, preferably between 0.025 and 0.05 millimeters. Through this, the thin spot obtains a certain Y "length," which contributes to the stability of the hinge in this region.

Preferably, recesses are provided on both sides of the thin spot in the Y direction, thus in the first and opposing second tapering zones. This results in a largely symmetric stress curve on both sides of the thin spot. In order to avoid stress peaks (hot spots), the recesses of the two tapering zones can be disposed offset from each other in the Z direction. A plurality of recesses can be disposed side by side in identical or different shape in the Z or Y direction.

The recesses do not have to be completely surrounded by material of the tapering zone. An embodiment in which at least one recess is formed as a pocket introduced laterally in the Z direction into the edge of the tapering zone is also conceivable. Preferably, a plurality of such pockets is provided symmetrically to an X-Y plane, which divides the hinge centrally in the Z direction.

According to an advantageous embodiment, the thin spot is divided into a plurality, preferably, two, thin spot segments Da, Db lying side by side in the width direction Z by at least one opening. A single central opening H in the thin spot, which can also penetrate the tapering zones, reduces the thin spot to two connecting regions spaced apart from each other in the Z direction. The opening removes material where it makes only a small contribution to the transfer of moments about a Y axis or X axis lying centrally in the hinge, which is different than in the edge regions, which have a greater distance to the center in the direction of the Z axis.

Preferably a plurality of recesses are disposed in the tapering zone or zones away from the thin spot. They can be spaced regularly or irregularly with respect to each other in the Y or Z direction, and can lie individually or in groups in the same or offset Z position with respect to the pivot axis. Alternatively or in addition, recesses can be provided on both sides of the pivot axis having the same or different distances to the pivot axis. Preferably, recesses are provided in a tapering zone in the Z direction that lie one behind the other with constant Z distance from each other and constant Y distance from the pivot axis, while a like arrangement of recesses is provided in the other tapering zone, thus on the other side of the pivot axis, where both recess groups are offset from each other in the Z direction by half the Z distance of the individual recesses. Preferably, one or all recesses have the same Y-Z cross section.

The production of recesses is preferably to take place by means of a laser beam (in this regard see Application DE102016105985).

The machining of the hinge to produce the recesses preferably takes place on both sides of the thin spot (looking in the X direction), so that, for example, the beveling of the machined edge that occurs in one-sided laser machining (conical shape through laser beam machining), and thus the undesirable characteristic torque that arises, is avoided or reduced.

The invention is suitable for all kinds of hinges, especially for monolithic solid body hinges and/or inserts in micromechanics. It concerns preferably measurement equipment, in particular balances with a flexure hinge according to the invention. Said hinge preferably forms a part of a lever, a coupling rod, a rotary hinge, a free flex pivot hinge, or a parallel arm mechanism. Balances can in particular operate by the principle of electromagnetic force compensation, strain gauge (DMS) or vibrating string.

These and other advantages and features of the invention will be apparent from the following description of representative embodiments, considered along with the accompanying drawings.

DESCRIPTION OF REPRESENTATIVE EMBODIMENTS

Figure 1:
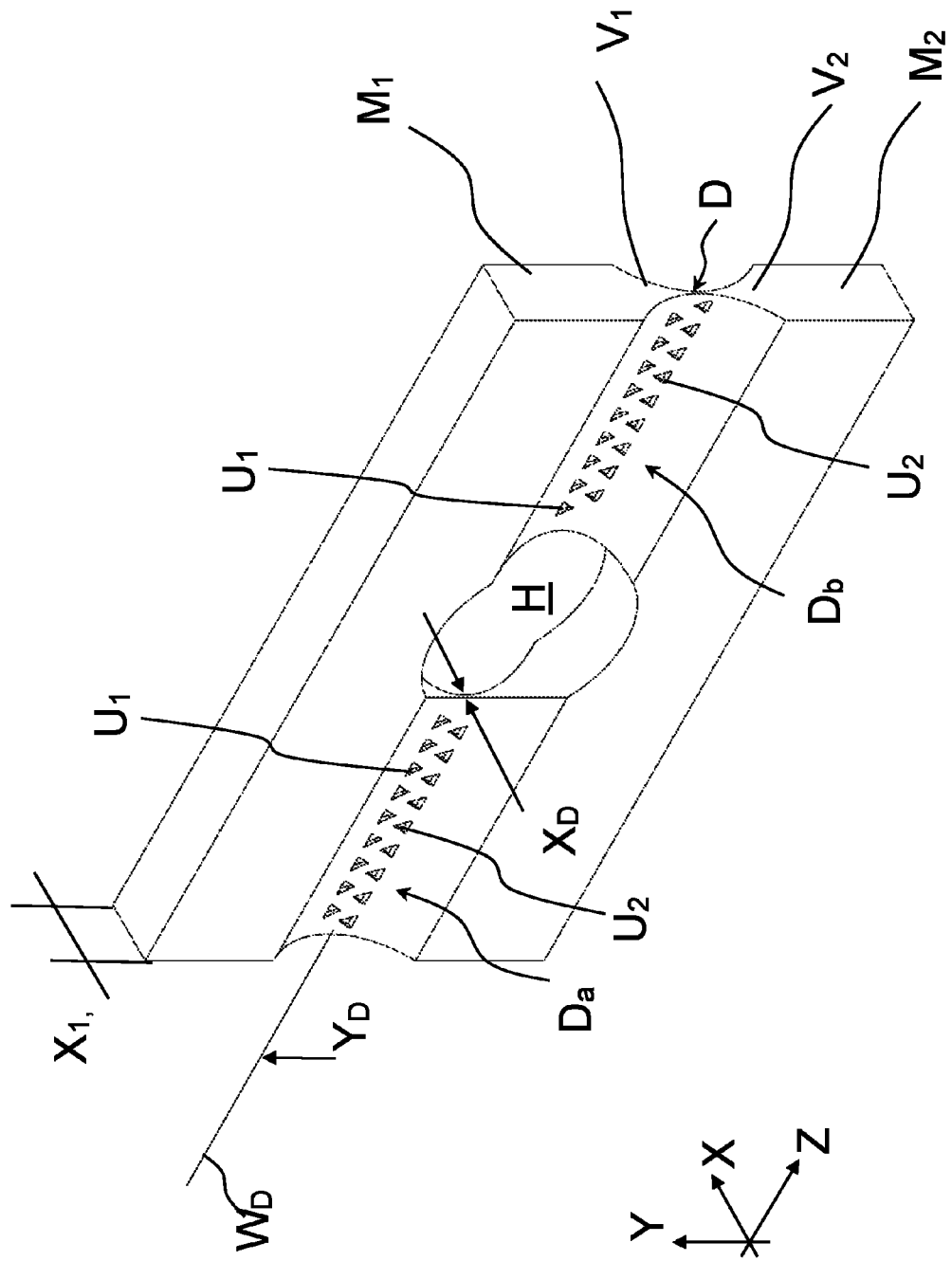
FIG. 1 shows a perspective view of a flexure hinge according to the invention.

FIG. 1 shows a flexure hinge according to the invention in a simplified perspective view. The hinge comprises two material segments $M_1$, $M_2$, which are monolithically joined to each other via a thin spot D. The thin spot D is formed by two tapering sections $V_1$, $V_2$, which extend in a lengthwise direction Y toward each other as part of the material segments $M_1$, $M_2$, where the thickness measured perpendicular thereto in the X direction steadily decreases up to a minimal thickness $X_D$, at which the actual thin spot D exists. It extends along a pivot axis $W_D$ in a width direction Z, which is perpendicular to the X and Y directions. The first material segment $M_1$ can be pivoted with respect to the second material segment $M_2$ about the thin spot D, where an idealized pivot axis $W_D$ runs in the Z direction at the lengthwise position $Y_D$ of the thin spot D. An opening H made centrally in the thin spot D divides the thin spot into two segments Da and Db in the Z direction.

A plurality of recesses $U_1$, $U_2$ of which not all are provided with reference numbers in the figures for reasons of clarity, penetrate the first and second tapering zones $V_1$, $V_2$ on both sides of the thin spot D (in the Y direction). The recesses $U_1$, $U_2$ are chosen so that the strength properties of the hinge at the thin spot D approximately coincide with the strength properties of the hinge at a distance from the thin spot that extends to the recesses $U_1$, $U_2$. The following figures explain this characteristic provided by recesses U1, U2 in more detail.

Figure 2:
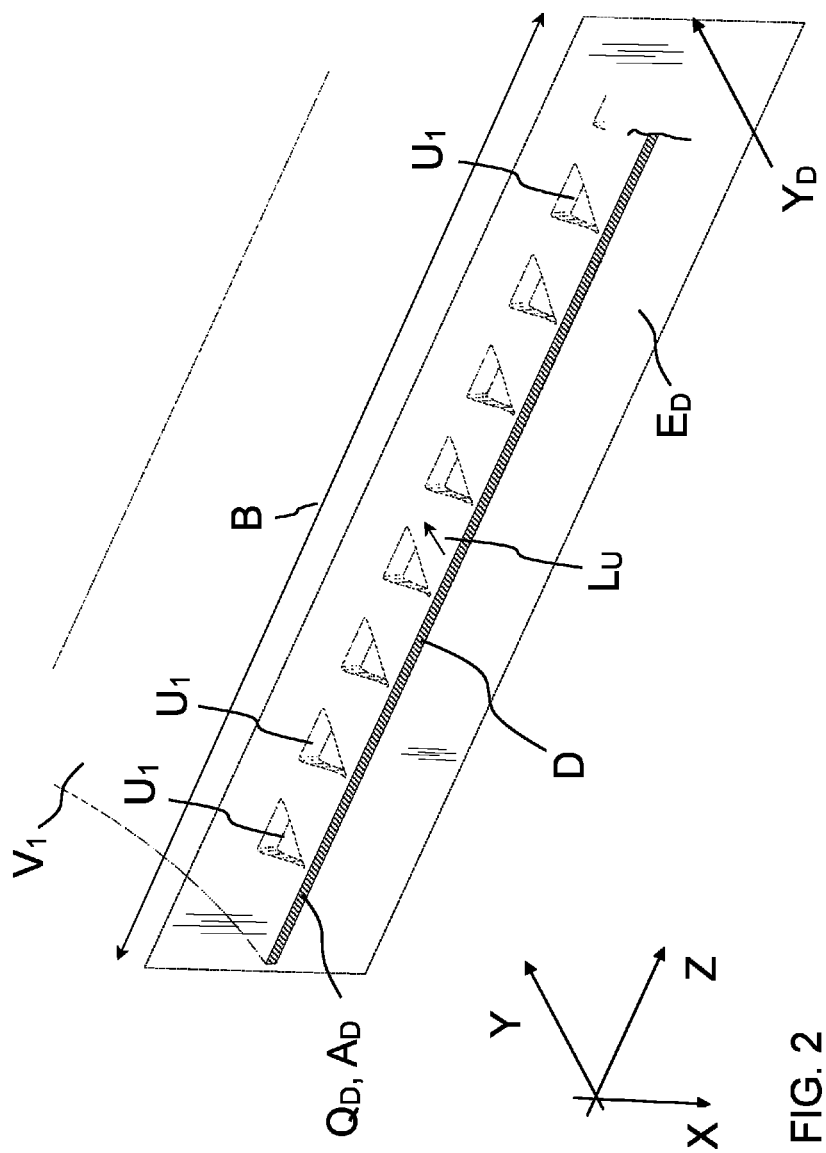
FIG. 2 shows a first perspective section of the hinge shown in FIG. 1.

FIG. 2 shows a section of the thin spot D with the width B (in the Z direction), in a magnified and sectioned view. A section plane $E_D$, which passes through the thin spot in the X-Z direction, produces a section $Q_D$ with cross section area $A_D$. The resulting cross section area $A_D$ has certain strength properties with respect to the normal stresses in the Y direction or with respect to bending moments about the pivot axis $W_D$. Since the thin spot D is formed along the imaginary section with B without interruptions, this results in a single cross section area $A_D$, which has a rectangular shape because of the cylinder section shaped surface of the tapering zones $V_1$, $V_2$.

Figure 3:
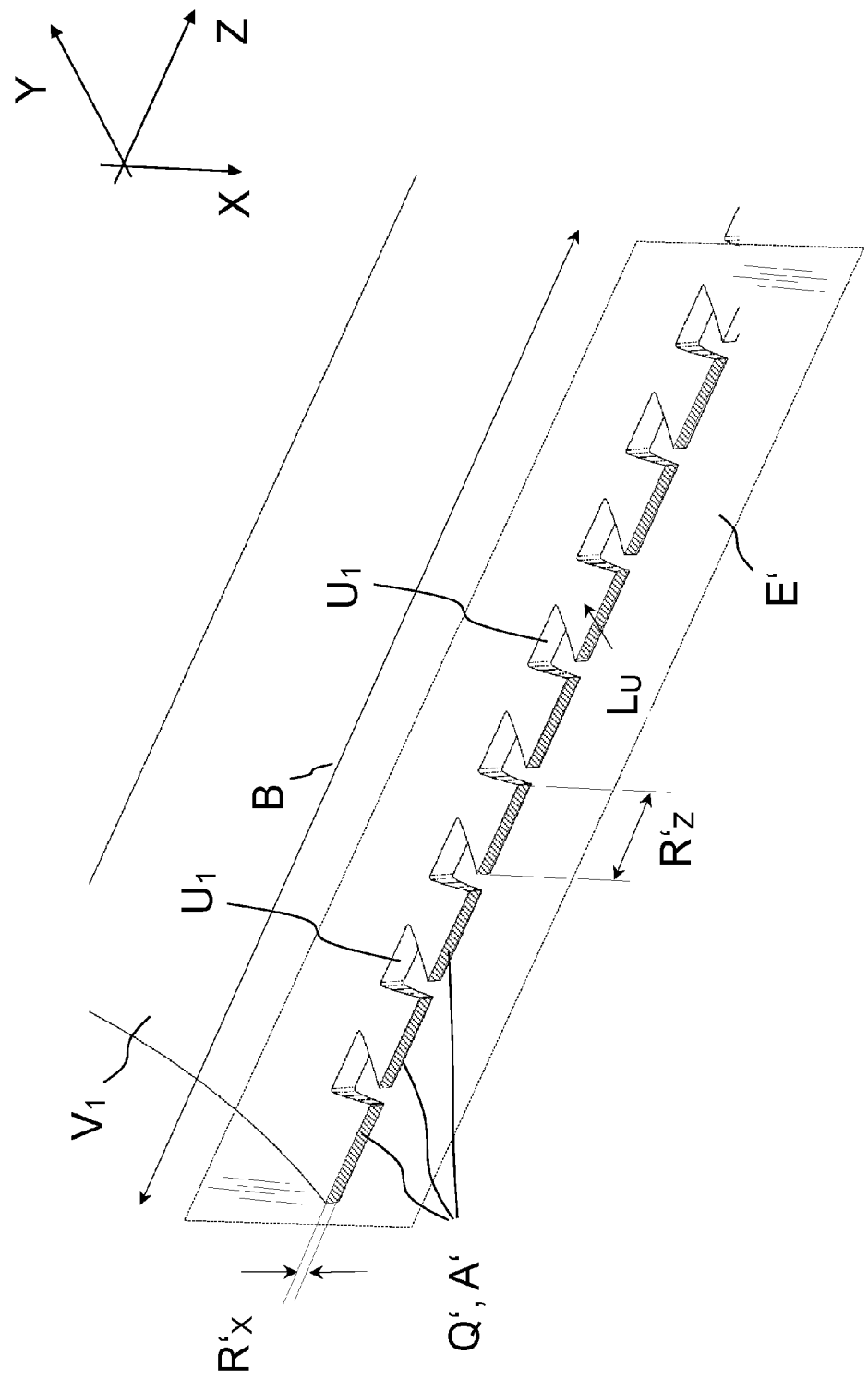
FIG. 3 shows a second perspective section of the hinge shown in FIG. 1 at a section plane further from the thin spot of the hinge as compared to the section of FIG. 2.

FIG. 3 shows a sectional view comparable to FIG. 2, where in this case a section plane E' shifted parallel to section plane $E_D$ in the Y direction passes through the region of the tapering zone $V_1$, which is penetrated by the recesses $U_1$. Correspondingly, a number of individual rectangular cross section areas lying side by side in the Z direction, which add up to a total area A', result from the section Q' of the plane E' with the tapering zone $V_1$. The individual rectangular areas (up to the segments lying at the edge in the Z direction) have a width $R'_z$. According to the invention the recesses $U_1$ are chosen so that the resulting cross section area A' coincides with the cross section area $A_D$ (area equivalent) formed in the thin spot. From this it follows that a tensile or compressive force in the thin spot D applied to the hinge in the Y direction generates the same stress ($\sigma=F/A$) as in the region of the plane E' or the cross section Q' that is there.

Figure 4:
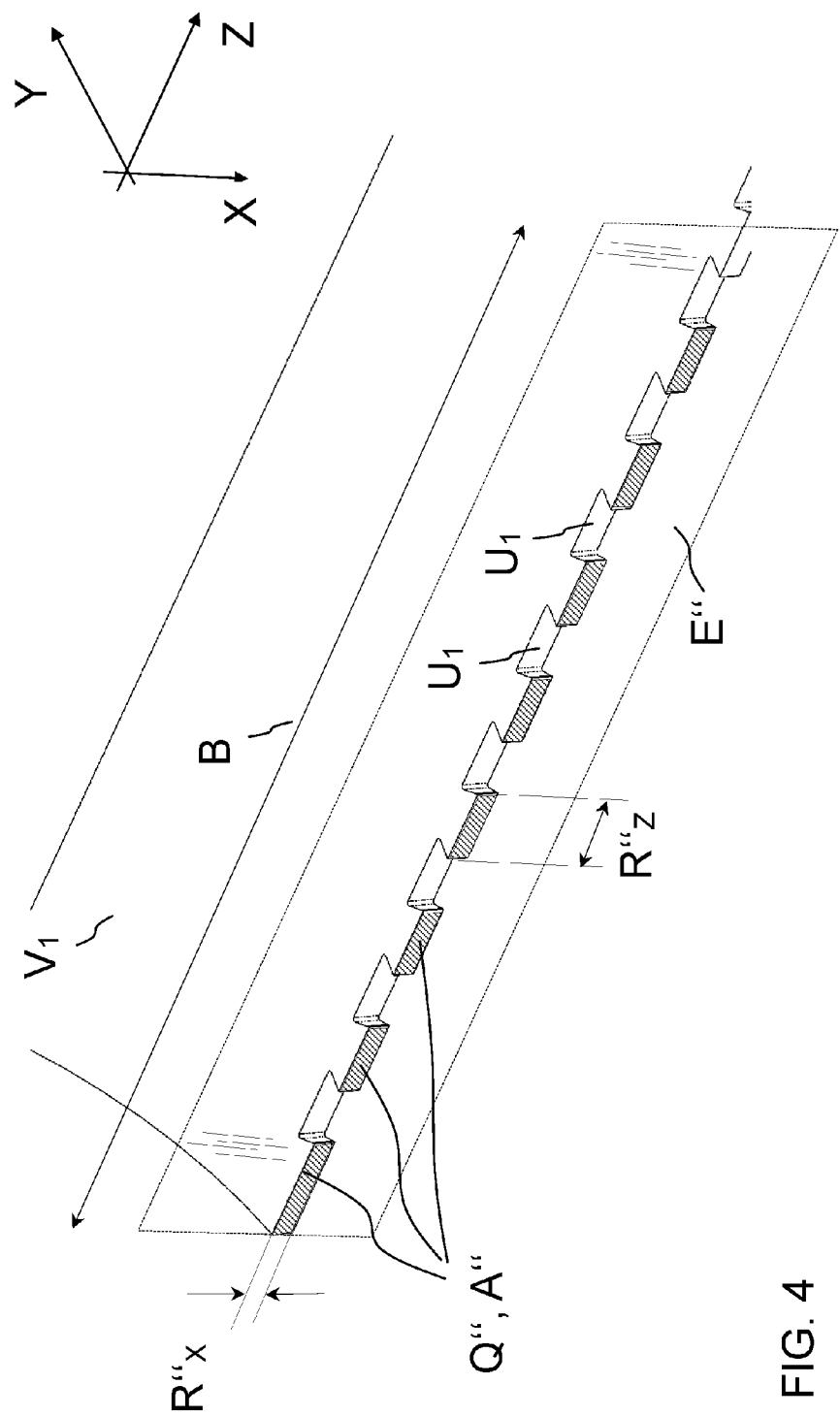
FIG. 4 shows a third perspective section of the hinge shown in FIG. 1 at a section plane further from the thin spot of the hinge as compared to the section of FIG. 3.

FIG. 4 shows another cross section Q", which results from the intersection of an additional section plane E" parallel to the planes $E_D$ and E', with the tapering zone at a Y position that is still farther from the thin spot than the section plane E', but still within the segment $L_U$. The resulting cross section area A" is further composed of individual rectangles, the width $R''_z$ of which (possibly with the exception of the section lying at the edge in the Z direction) is, however, smaller than in the case of cross section Q'. However, because the material thickness of the tapering zone $V_1$ increases with increasing Y distance from the thin spot, the thicknesses $R'_x$, $R''_x$ of the individual partial cross section correspondingly increase. As a result, it follows from the shape, chosen per the invention, of the recesses $U_1$ along the segment $L_U$ that the cross section area A" also corresponds with the cross section area A' or $A_D$ (area equivalent). This effect, thus the area stress or area load that largely remains constant with increasing Y distance from the thin spot D, applies in the embodiment shown along the selected segment $L_U$ because of the suitable shape of the recesses $U_1$. The segment $L_U$ can extend over the entire Y length of a recess $U_1$, $U_2$ or can involve only a part of it.

An imaginary shift of the section plane E along the segment $L_U$ in this embodiment example always produces a total cross section A', A" . . . , the size of which corresponds with that of $A_D$ of the thin spot D.

The flexure hinge represented in FIGS. 2 to 4 was created by means of its recesses $U_1$, $U_2$ so that the sections $Q_D$, Q', and Q" formed along the segment $L_U$ always produce the same total cross section area, so that tensile or compressive stresses along the segment $L_U$ and in this respect independent of the Y distance to the thin spot D remain largely constant.

The same principle, which is not shown in the figures, also applies if, instead of the normal stresses, the bending stresses, which result from a bending of the material segments $M_1$, $M_2$ relative to each other about the Z axis (moment of resistance equivalent), are to be kept constant. Since the moment of resistance of a cross section area to bending is overproportional to the height of the cross section (in this case on the thickness $R'_x$, $R''_x$ of the individual partial cross sections), the recesses $U_1$, $U_2$ are chosen correspondingly so that the relevant width $R'_z$, $R''_z$ of the partial cross sections is overproportionally reduced with increasing Y distance, in order to produce a constant moment of resistance as a result.

Figure 5:
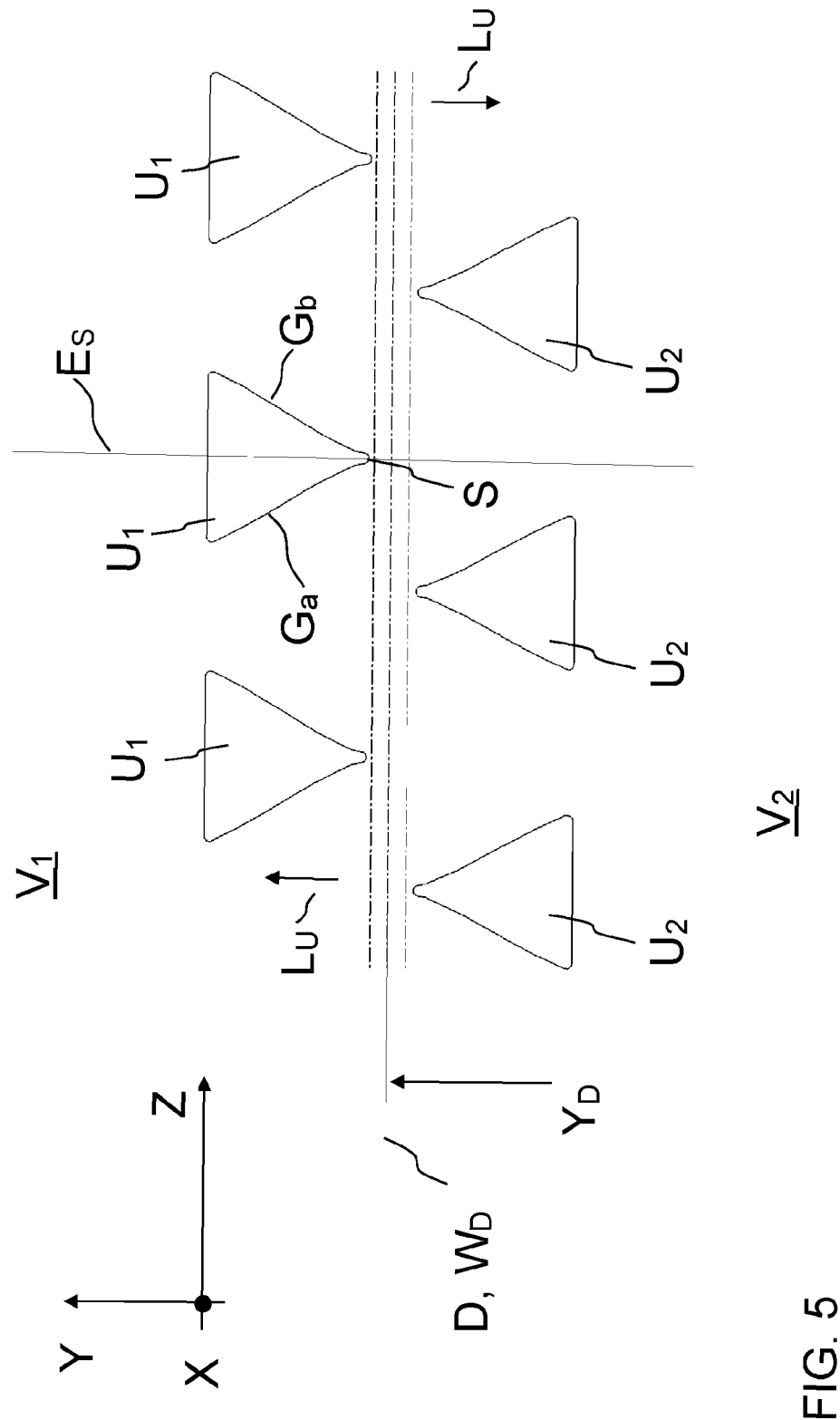
FIG. 5 shows a schematic top view of a section of a flexure hinge.

FIG. 5 shows a section of the flexure hinge according to the invention from FIGS. 1 to 4 in a top view in the X direction. The thin spot D extends in the width direction Z along an idealized pivot axis $W_D$ at the Y position of the thin spot, $Y_D$. In the tapering zones $V_1$, $V_2$ on both sides of the thin spot D in the Y direction are approximately triangular recesses $U_1$, $U_2$, as was already described in FIGS. 2 to 4. The outline of each recess $U_1$, $U_2$ comprises in this case two boundary lines $G_a$, $G_b$, which, starting from a common vertex S, extend symmetrically on both sides of an imaginary section plane $E_S$, which runs in the X-Y direction through the vertex S. The recesses $U_1$, $U_2$ are each bounded at their ends turned away from the thin spot D by wall segments running in the Z direction.

As FIG. 5 also shows, the recesses $U_1$, $U_2$ do not border directly on the idealized pivot axis $W_D$ of the thin spot D, but rather have a small Y distance from it. To avoid hot spots and undefined weaknesses of the thin spot, the recesses $U_1$, $U_2$ first begin at a small Y distance from the thin spot D.

Figure 6:
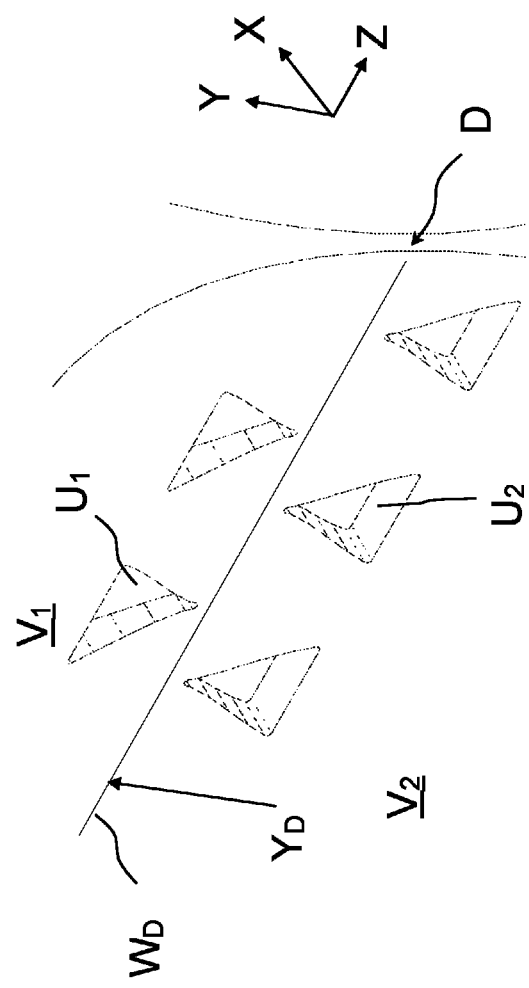
FIG. 6 shows a perspective view of a flexure hinge segment.

FIG. 6 shows a perspective of a flexure hinge according to the invention with the recesses $U_1$, $U_2$ in the tapering zones $V_1$, $V_2$.

As used herein, whether in the above description or the following claims, the terms "comprising," "including," "carrying," "having," "containing," "involving," and the like are to be understood to be open-ended, that is, to mean including but not limited to.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE NUMBER LIST

X Thickness direction
Y Length direction
Z Width direction
$M_1$, $M_2$ Material segment
$V_1$, $V_2$ Tapering zone
D Thin spot
Da, Db Thin spot segments
H Opening
$W_D$ Pivot axis
$U_1$, $U_2$ Recesses
$Q_D$ Cross section through thin spot D
$Q'_v$, $Q''_v$ Cross section through tapering zone
$E_D$ Section plane through thin spot
E', E" Section planes through tapering zone
$E_S$ Section plane through tapering zone
B Section width
$R_X$ Thickness of a partial cross section area
$R_Z$ Width of a partial cross section area
$A_D$ Cross section area through the thin spot
A', A" Cross section area in the sections Q', Q"
$L_U$ Segment section in the Y direction.

The invention claimed is:

1. A flexure hinge comprising:
   (a) a first material segment and a second material segment monolithically connected together along a thin spot which defines an imaginary pivot axis between the first material segment and the second material segment, at least one of the first material segment and the second material segment having a thickness along a direction X which tapers in a tapering zone along a direction Y perpendicular to the direction X to a minimal thin spot thickness, the imaginary pivot axis extending in a direction Z perpendicular to the direction X and the direction Y;
   (b) at least one recess positioned in the tapering zone of the at least one of the first material segment and the second material segment; and
   (c) wherein the at least one recess is formed so that a direction X and direction Z plane passing through the at least one recess intersects the respective material segment to define a cross section that provides a strength that corresponds, within tolerances, to the strength provided by the cross section defined by the intersection of a direction X and direction Z plane passing through the thin spot.

2. The flexure hinge of claim 1 wherein the cross section defined by a given direction X and direction Y plane passing through the at least one recess comprises a number of cross section areas spaced apart along the direction Z and comprising geometric shapes the width of which along the direction Z decrease with increasing distance along the direction Y from the position of the thin spot along the direction Y.

3. The flexure hinge of claim 2 wherein the at least one recess is formed such that along at least a portion of the length of the at least one recess along the direction Y, the cross section areas define a constant total area regardless of the point along the direction Y at which the given direction X and direction Z plane intersects the at least one recess.

4. The flexure hinge of claim 3 wherein the constant total area is equal to the area defined by the intersection of the direction X and direction Z plane through the thin spot.

5. The flexure hinge of claim 2 wherein the cross section areas spaced apart along the direction Z comprise a plurality of identical geometric shapes.

6. The flexure hinge of claim 1 wherein along at least a portion of the length of the at least one recess along the direction Y, a moment of resistance about the imaginary pivot axis remains constant.

7. The flexure hinge of claim 1 wherein the cross section of the thin spot defined by the intersection of the direction X and direction Z plane at the thin spot has the shape of one or more rectangles.

8. The flexure hinge of claim 1 wherein the at least one recess has an outline in a direction Y and direction Z plane in which:
   (a) two boundary lines extend away from the thin spot along the direction Y from a common vertex which comprises the part of the at least one recess lying closest to the thin spot; and
   (b) where one or both boundary lines depart from a plane defined by the direction X and direction Y plane lying at the vertex, the departure being symmetric along a curve with increasing distance from the thin spot along the direction Y.

9. The flexure hinge of claim 8 wherein a segment of the curve is formed in dependence on the material thickness of the tapering zone given at the respective position along the direction Y.

10. The flexure hinge of claim 1 including multiple recesses identical in shape and lying side by side along the direction Z.

11. The flexure hinge of claim 1 wherein one or more recesses are provided along the direction Y in each of the first material segment and the second material segment on both sides of the thin spot.

12. The flexure hinge of claim 11 wherein the first material segment and the second material segment each include a respective tapering zone and at least one recess is provided in each tapering zone and wherein each recess is positioned the same distance from the thin spot along the direction Y.

13. The flexure hinge of claim 1 wherein that the thin spot is divided by at least one opening into a plurality of thin spot segments that lie side by side in the direction Z.

14. A measurement apparatus comprising the flexure hinge of claim 1 wherein the flexure hinge is part of a lever, a coupling rod, a rotating hinge, a free flex pivot hinge, or a parallel arm mechanism.

15. A method for producing a flexure hinge according to claim 1 wherein the at least one recess is introduced into the tapering zone at least in part with a laser applied on both sides of a direction Y and direction Z plane lying at the imaginary pivot axis.

* * * * *